United States Patent Office 2,696,177
Patented Dec. 7, 1954

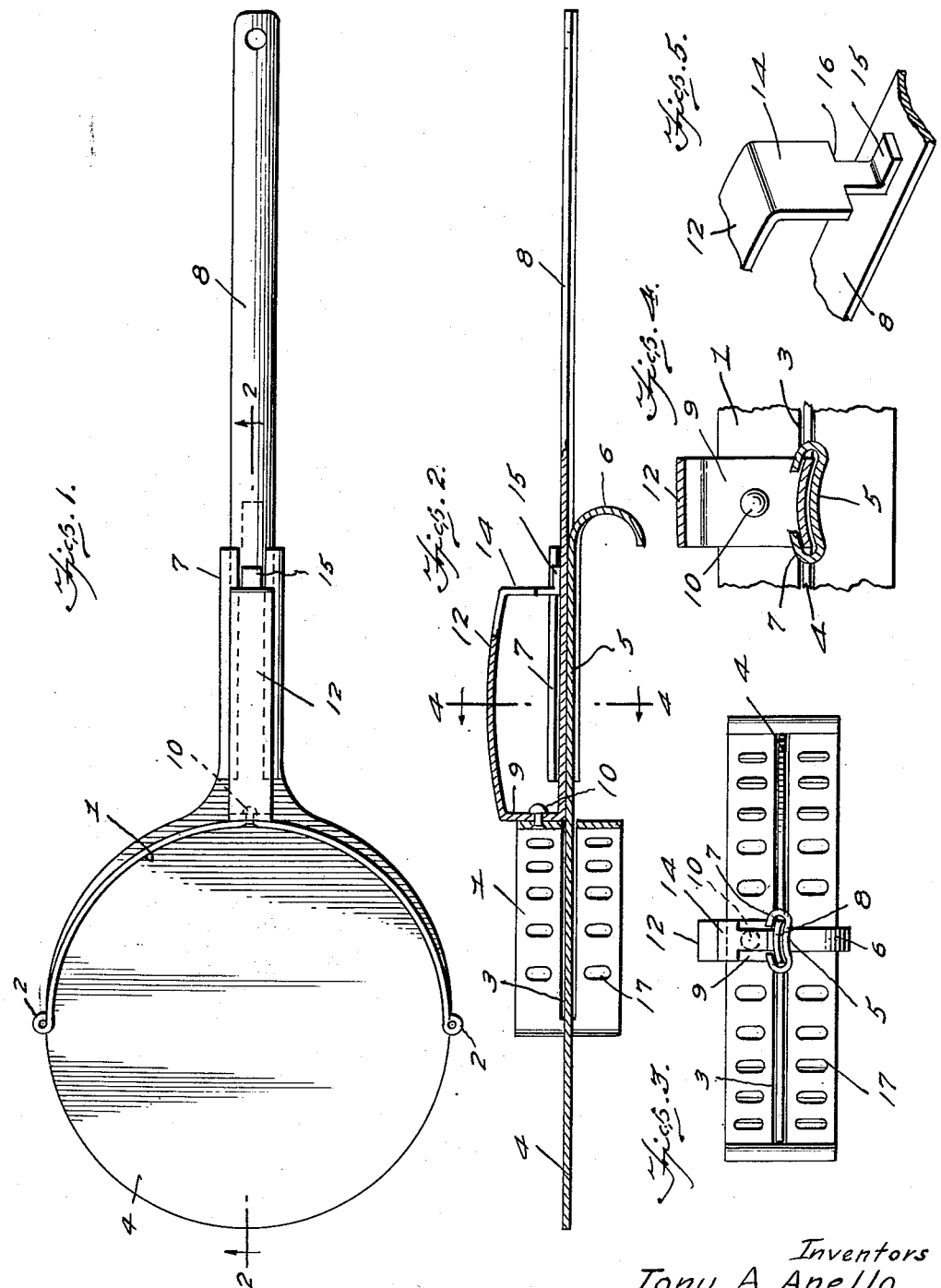
Inventors
Tony A. Anello
Eugenie La Course

2,696,177

LAYER CAKE LAYER

Tony A. Anello and Eugenie La Course, Tampa, Fla.

Application August 24, 1953, Serial No. 375,862

1 Claim. (Cl. 107—1)

This invention is a layer cake layer and it is primarily an object of the invention to provide an implement of this kind that can be used to advantage in laying out a cake layer and in a manner whereby is materially reduced the breaking of such cake layer in the operation.

Furthermore, it is an object of the invention to provide an implement of this kind where the user may conveniently operate or manipulate the same by the use of one hand.

The invention also has for an object to provide an implement of the character hereinbefore designated which constitutes a material improvement over a kindred device as comprised in United States Patent No. 2,006,579 dated July 2, 1935.

The invention consists in the details of construction and in the combination and arrangement of the several parts of my improved layer cake layer whereby certain advantages are attained, as will be hereinafter more fully set forth.

In order that my invention may be better understood, I will now proceed to describe the same with reference to the accompanying drawing, wherein:

Figure 1 is a view in top plan of the implement constructed in accordance with an embodiment of the invention.

Figure 2 is a view partly in section and partly in elevation of the device as illustrated in Figure 3, the section being taken substantially on the line 2—2 of Figure 1;

Figure 3 is a view in rear elevation of the device as shown in Figures 1 and 2;

Figure 4 is an enlarged fragmentary detail sectional view taken substantially on the line 4—4 of Figure 2, looking in the direction of the arrows, the supporting plate being omitted; and Figure 5 is a fragmentary view in perspective illustrating the outer end portion of the loop element and the associated portion of the handle member.

As illustrated in the accompanying drawings, 1 denotes an arcuate member substantially semi circular in plan and of a height approximately the thickness of two cake layers. This member 1 is of a fixed formation and has its extremities rolled back, as at 2, to avoid such cutting edges that might mar the cake layers with which the device or implement is being used.

The member 1 is on a radius approximating the radius of the cake layer with which it is to be employed and said member at about the transverse center thereof is provided with a slot 3 extending from substantially the opposite end thereof.

A cake supporting plate 4 freely moves through the slot 3 and said plate 4 as herein disclosed is flat and is substantially circular in plan with a radius substantially the same as that of the member 1. This plate 4 is also of a diameter not less than the diameter of the cake layer with which the device or implement is used.

The rear or inner central portion of the plate 4 is provided with an outwardly disposed elongated arm 5, the major portion of which is slightly arcuate in cross section from a point closely adjacent to the plate 4 to the outer end of the arm 5. The outer end of the arm 5 is continued by a depending trigger or finger grip 6 for a purpose to be later explained.

The side margins of the arm 5 are provided therealong with the reverted flanges 7 which engage over the longitudinal marginal portions of an elongated handle member 8 also slightly arcuate in cross section throughout its length to give rigidity to the member 8.

The inner end of the handle member 8 is continued by a substantially perpendicularly related short arm 9 having close contact with the central portion of the member 1 above the slot 3. This short arm 9 is rigidly held to the member 1 by a rivet 10 or otherwise as may be desired. The upper or outer extremity of the arm 9 is continued by the rearwardly disposed handle arm 12 disposed lengthwise on a predetermined outbow and terminating at its outer end in a substantially perpendicularly related short arm 14 disposed toward the handle member 8. This arm 14 is continued by an angular foot 15 in direct contact with the top face of the handle member 8 and welded or otherwise securely attached thereto. The foot 15 is of a width less than the width of the adjacent portion of the arm 14 whereby side spaces 16 are provided to avoid obstruction to the flanges 7 in applying or removing the plate 11 when desired.

In practice, with the plate 4 in its forward position as illustrated in Figures 1 and 2, a cake layer is placed on said plate with the member 1 in close proximity to the marginal edge of the cake layer. The operator then preferably grasps the handle arm 12 and places the plate 4 over a bottom cake layer. The operator then grasps the outer portion of the handle member 8 and with a digit of such hand draws upon the trigger or finger hold 6 and shifts the plate 4 outwardly from beneath the cake layer thereon so that such layer will drop in desired position upon the bottom cake layer. During this operation shifting of the bottom cake layer is prevented by the member 1, the lower portion of which being immediately adjacent to the marginal edge of said bottom cake layer. It is to be noted that a cake layer may be placed by the operator, by the use of a single hand, leaving the second hand for such uses as the necessities of practice may require.

The member 1 above and below the slot 3 and from substantially one end of said member to the other is provided with the closed spaced openings or slots 17 to permit visual access to the cake layers during the use of the device or implement.

We claim:

In an implement for handling cake layers, a fixed plate of substantially semi-cylindrical form having a slot extending between its ends in the longitudinal center thereof, a circular plate movable through said slot, an elongated handle extending radially from the vertical center of said fixed plate above said slot, a hand-hold formed by an upwardly bowed portion of said handle immediately adjacent to said fixed plate, an arm projecting radially from the edge of said circular plate beneath and in line with said handle, reverted flanges formed along the side edges of said arm and engaged over the side edges of said handle for sliding movements relatively thereto, and a finger grip formed at the free end of said arm to effect the withdrawal of said circular plate outwardly through said slot to deposit an upper cake layer on top of an underlying cake layer, the free end of said handle extending a distance beyond the finger grip on said arm.

References Cited in the file of this patent

UNITED STATES PATENTS

| Number | Name | Date |
| --- | --- | --- |
| 476,353 | Allred | June 7, 1892 |
| 1,135,906 | Ludwig | Apr. 13, 1915 |
| 1,231,313 | Twedell | June 26, 1917 |
| 2,006,579 | Anello et al. | July 2, 1935 |